(12) United States Patent
Zakrewski

(10) Patent No.: US 9,674,878 B2
(45) Date of Patent: *Jun. 6, 2017

(54) APPARATUS AND METHODS FOR ACCESSING A DATA NETWORK

(71) Applicant: General Dynamics C4 Systems, Inc., Scottsdale, AZ (US)

(72) Inventor: Robert Zakrewski, Bristol (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,591

(22) Filed: Jan. 25, 2016

(65) Prior Publication Data

US 2016/0143067 A1 May 19, 2016

Related U.S. Application Data

(63) Continuation of application No. 14/087,656, filed on Nov. 22, 2013.

(51) Int. Cl.
*H04W 76/02* (2009.01)
*H04W 24/04* (2009.01)
(Continued)

(52) U.S. Cl.
CPC .......... *H04W 76/02* (2013.01); *H04L 47/32* (2013.01); *H04L 65/102* (2013.01);
(Continued)

(58) Field of Classification Search
CPC ..... H04L 47/00; H04L 47/32; H04L 65/1013; H04L 65/102; H04W 24/04
See application file for complete search history.

(56) References Cited

U.S. PATENT DOCUMENTS 8,982,811 B2 * 3/2015 Wang .............. H04L 45/302
370/329
2007/0208864 A1 * 9/2007 Flynn .............. H04L 63/02
709/227
(Continued)

FOREIGN PATENT DOCUMENTS

WO 2010119707 A1 10/2010

OTHER PUBLICATIONS

Extended European Search Report; issued Apr. 22, 2015 from European Patent Application No. 14192378.9-1854.
(Continued)

*Primary Examiner* — Chi H Pham
*Assistant Examiner* — Weibin Huang
(74) *Attorney, Agent, or Firm* — Fitch Even Tabin & Flannery LLP

(57) ABSTRACT

A packet data network gateway, P-GW, is located in a second network for supporting user plane data to terminal devices in a wireless communications system that additionally comprises a first network having a first packet data network gateway, P-GW operably couplable to the P-GW. The P-GW comprises a processor arranged to: check a destination address of received packets from the first P-GW to determine whether the received packets are destined for any of the terminal devices, and in response thereto: extract one or more properties of said received packets if they are destined for any of the terminal devices served with user plane data; or discard said received packets if they are not destined for the terminal device(s).

10 Claims, 10 Drawing Sheets

(51) Int. Cl.
  *H04L 12/823* (2013.01)
  *H04L 29/06* (2006.01)
  *H04W 24/08* (2009.01)
  *H04W 40/24* (2009.01)
  *H04W 92/16* (2009.01)
  *H04W 88/16* (2009.01)

(52) U.S. Cl.
  CPC ........... *H04W 24/04* (2013.01); *H04W 24/08* (2013.01); *H04W 40/24* (2013.01); *H04W 88/16* (2013.01); *H04W 92/16* (2013.01)

(56) References Cited

U.S. PATENT DOCUMENTS

| | | | |
|---|---|---|---|
| 2010/0220656 A1 | 9/2010 | Ramandutty et al. | |
| 2010/0260109 A1* | 10/2010 | Ulupinar | H04L 12/4633 370/328 |
| 2011/0158171 A1* | 6/2011 | Centonza | H04L 12/2856 370/328 |
| 2011/0242994 A1* | 10/2011 | Carvalho | H04L 43/022 370/252 |
| 2014/0003328 A1* | 1/2014 | Mildh | H04W 72/048 370/315 |
| 2015/0146723 A1* | 5/2015 | Zakrzewski | H04L 47/32 370/392 |
| 2015/0257182 A1* | 9/2015 | Li | H04W 48/18 370/329 |

OTHER PUBLICATIONS

Communication Pursuant to Article 94(3) EPC; European Patent Application No. 14 192 378.9-1854 Dated Sep. 14, 2016.

* cited by examiner

FIG. 1- Prior art

APPARATUS AND METHODS FOR ACCESSING A DATA NETWORK

RELATED APPLICATION(S)

This is a continuation of U.S. patent application Ser. No. 14/087,656, filed Nov. 22, 2013, entitled APPARATUS AND METHODS FOR ACCESSING A DATA NETWORK, which is incorporated by reference in its entirety herein.

FIELD OF THE INVENTION

The field of the invention relates to methods and apparatus for accessing data networks, for example packet data network gateways.

BACKGROUND OF THE INVENTION

A recent development in third generation (3G) wireless communications is the long term evolution (LTE) cellular communication standard, sometimes referred to as 4th generation (4G) systems. Both of these technologies are compliant with third generation partnership project (3GPP™) standards. Irrespective of whether LTE spectral allocations use existing second generation (2G) or 3G allocations being re-farmed for fourth generation (4G) systems, or new spectral allocations for existing mobile communications, they will generally use paired spectrum for frequency division duplex (FDD) operation.

Referring to FIG. 1, an example of a simplified evolved packet system (EPS) 100 is illustrated comprising, part of an evolved packet core (EPC) network 101, access network 103 and user equipment (UE) domain 105. In this case, EPC network 101 comprises the Internet 128, a packet data network gateway (P-GW) 107, a serving gateway (S-GW) 111 and a mobility management entity (MME) 113. The P-GW 107 is situated between the Internet 128 and the S-GW 111, and may include responsibility for IP address allocation for UEs 115, as well as Quality of Service (QoS) enforcement and flow based charging according to rules of a policy control and charging rules function (not shown). The P-GW 107 is responsible for filtering of downlink user Internet Protocol (IP) packets into different QoS-based bearers. The P-GW 107 also serves as a mobility anchor for inter-working with non-3GPP technologies such as CDMA2000 and WiMAX™ networks. All IP packets are transferred from the P-GW 107 to the serving gateway (S-GW) 111 via an S5/S8 interface, which serves as a local mobility anchor for data bearers when user equipment (UEs) 115 move between base stations/eNodeBs 117. The S-GW 111 also retains the information about the bearers when the UEs are in idle state (known as EPS Connection Management IDLE (ECM-IDLE)) and temporarily buffers downlink data while the MME 113 initiates paging of the UEs 115 to re-establish the bearers. In addition, the S-GW 111 performs some administrative functions in the access network 103, such as collecting information for charging and legal interception. It also serves as a mobility anchor for inter-working with other 3GPP technologies such as general packet radio service (GPRS) and universal mobile telecommunications service (UMTS). The S-GW 111 is coupled to the MME 113 via an S11 interface.

Access network 103, defined by a number of inter-connected eNodeBs 117, is generally utilised when UEs 115 are in a network's coverage area 119, thereby allowing UEs 115 to communicate with each other solely via the access network 103. Generally, the access network 103 communicates with the EPC network 101 via S1-U 121 and S1-MME 123 interfaces. eNodeBs 117 are operable to communicate with each other within the access network 103 via X2 interfaces 125. In this case, UEs 115 are operable to communicate with eNodeBs 117 via a Uu interface, otherwise known as radio interface 127. In this case, access network 103 is utilised when UEs 115 are within the access network's 103 network coverage 119, allowing them to communicate with one another. Generally, the access network 103 facilitates communication by receiving control plane data and user plane data from each eNodeB 117 and from UEs 115, and transmitting this control plane data and user plane data to the other eNodeBs 117 within the access network 103. Different eNodeBs 117 within the access network 103 may utilise different receiving and transmitting frequencies, for example if Frequency Division Duplexing (FDD) is utilised. Further, different eNodeBs 117 within the access network 103 may utilise different waveforms, signal modulation and coding schemes between the different eNodeBs 117. Specifically, in a generic LTE system, referred to as E-UTRAN, the Uu radio interface 127 generally utilises Orthogonal Frequency Division Multiple Access (OFDMA) in the Downlink and Single Carrier Frequency Division Multiple Access (SC-FDMA) in the Uplink. OFDMA distributes subcarriers to different users (UEs) at the same time, allowing multiple users to be scheduled to receive data simultaneously.

Generally, subcarriers are allocated in contiguous groups for simplicity and to reduce any overhead of indicating which subcarriers have been allocated to each user. SC-FDMA is generally utilised in the Uplink case as it has a lower peak-to-average power ratio compared to OFDMA, which can benefit mobile terminal devices in terms of transmit power efficiency, for example. As discussed above, FDD may be utilised resulting in differing transmit and receive carrier frequencies. Further, Time Division Duplexing (TDD) may be utilised, resulting in separate outward and return signals.

A potential problem occurs when, for example, the P-GW 107 within the EPC network 101 fails. If this failure occurs, at least user plane data will be affected, and it may not be possible to access the packet data network 128 or route data to the UEs 115. Failure of the P-GW 107 may prevent public safety systems from offering services to local users. Therefore, in some cases, it may be desirable for public safety systems to be able to offer services to local users despite failures within the EPC network 101.

SUMMARY OF THE INVENTION

In a first aspect of the invention, a packet data network gateway, P-GW, is located in a second network for supporting user plane data to terminal devices in a wireless communications system that additionally comprises a first network having a first packet data network gateway, P-GW, operably couplable to the P-GW. The P-GW comprises a processor arranged to: check a destination address of received packets from the first P-GW to determine whether the received packets are destined for any of the terminal devices, and in response thereto: extract one or more properties of said received packets if they are destined for any of the terminal devices served with user plane data; or discard received packets that are not destined for the terminal devices.

Optionally, the processor is further arranged to determine an operational status of at least one of a backhaul link of the second network, or the first P-GW located in the first network.

Optionally, the processor may be arranged to build context information for the terminal devices from signalling used to establish a single packet data network connection for the terminal device that traverses through the first P-GW and the P-GW located in the second network.

Optionally, the processor may be operably coupled to a memory element arranged to store the terminal device context information.

Optionally, the processor may be arranged to monitor and build terminal device context information for a plurality of terminal devices being served with user plane data by the second network.

Optionally, the processor may further perform packet analysis or statistical analysis on said received packets.

Optionally, the processor may further invoke a bearer mapping function within the second network. Optionally, the processor further may invoke a bearer mapping function within the second network based on at least one from a group of: one or more source IP address(es), one or more destination IP address(es), one or more source port number(s), one or more destination port number(s), one or more protocol type packet properties, packet analysis on said received packets.

Optionally, the processor may determine that both of the backhaul link and first P-GW are available, and, therefore, the processor may be arranged to perform at least one of: trigger deferred signalling between an MME and/or SGW and the first network; return to a state that determines an operational status of at least one of: the backhaul link, first P-GW; and trigger user plane handling.

Optionally, the processor may be arranged to re-encapsulate, modify and forward a received data packet on a tunnel established by the first P-GW.

According to a second aspect of the invention, a method of operation of a (second) packet data network gateway (P-GW) located in a second network for supporting user plane data in a wireless communications system that additionally comprises a first network having a first packet data network gateway (P-GW) operably couplable to the (second) P-GW is illustrated. The method comprises, at the (second) P-GW: checking a destination address of received packets from the first P-GW to determine whether the received packets are destined for any of the terminal devices, extracting one or more properties of said received packets if they are destined for any of the terminal devices served with user plane data; or discarding received packets that are not destined for the terminal device(s).

According to a third aspect of the invention, a non-transitory computer program product comprising executable program code for operation of a (second) packet data network gateway (P-GW) located in a second network for supporting user plane data in a wireless communications system that additionally comprises a first network having a first packet data network gateway (P-GW), the executable program code operable for, when executed at the (second) P-GW, performing the abovementioned method.

According to a fourth aspect of the invention, an integrated circuit for a (second) packet data network gateway, P-GW, is located in a (second) network for supporting control plane data in a wireless communications system that additionally comprises a (first) network having a first P-GW operably couplable to the P-GW. The integrated circuit comprises a processor arranged to: check a destination address of received packets from the first P-GW to determine whether the received packets are destined for any of the terminal devices, and extract one or more properties of said received packets if they are destined for any of the terminal devices served with user plane data; or discard said received packets if they are not destined for the terminal device(s).

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 2:
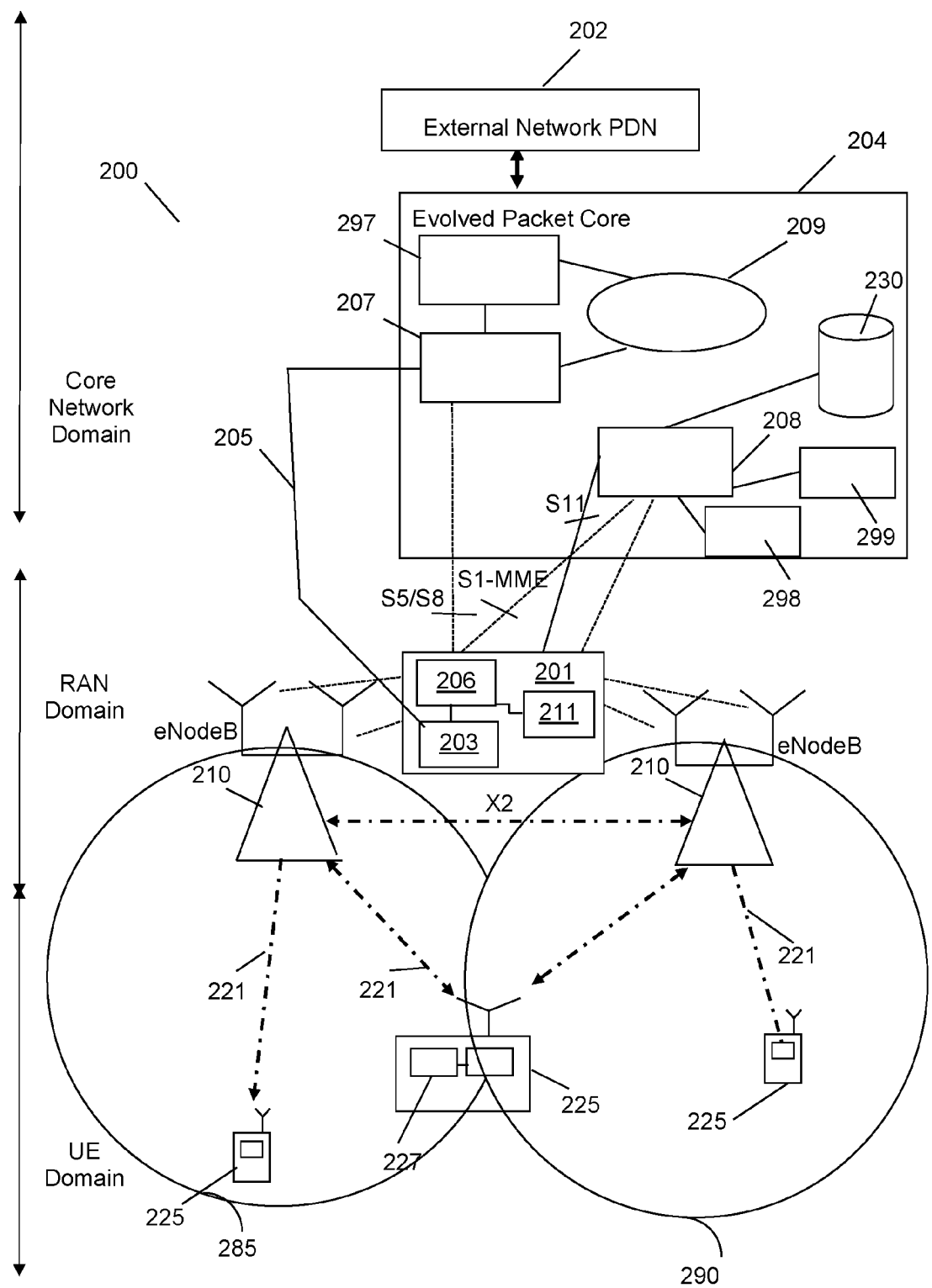
FIG. 2 illustrates a 3GPP™ LTE cellular communication system adapted in accordance with some example embodiments of the present invention.

Referring now to FIG. 2, a wireless communication system 200 is shown in outline, in accordance with an example embodiment of the invention. In this example embodiment, the wireless communication system 200 is compliant with, and contains network elements capable of operating over, a 3rd Generation Partnership Project (3GPP™) air-interface. In particular, the embodiment relates to a system's architecture for an Evolved-UMTS Terrestrial Radio Access Network (E-UTRAN) wireless communication system specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture comprises of radio access network (RAN) and core network (CN) elements 204, with the core network elements 204 being coupled to external networks 202 (named Packet Data Networks (PDNs)), such as the Internet or a corporate network. The CN elements 204 comprise a packet data network gateway (P-GW) 207. In order to serve up local content, the P-GW 207 may be coupled to a content provider. The P-GW 207 may be further coupled to a policy control and rules function entity (PCRF) 297.

The PCRF 297 may be operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a UE's 225 subscription profile.

A home subscriber server (HSS) database 230 may store UE subscription data such as QoS profiles and any access restrictions for roaming. The HSS database 230 may also store information relating to the P-GW 207 to which a UE 225 can connect. For example, this data may be in the form of an access point name (APN) or a packet data network (PDN) address. In addition, the HSS database 230 may hold dynamic information relating to the identity of a mobility management entity (MME) 208 to which a UE 225 is currently connected or registered.

The MME 208 may be further operable to control protocols running between the user equipment (UE) 225 and the CN elements 204, which are commonly known as Non-Access Stratum (NAS) protocols. The MME 208 may support at least the following functions that can be classified as: functions relating to bearer management (which may include the establishment, maintenance and release of bearers), functions relating to connection management (which may include the establishment of the connection and security between the network and the UE 225) and functions relating to inter-working with other networks (which may include the handover of voice calls to legacy networks). The MME 208 may be further coupled to an evolved serving mobile location center (E-SMLC) 298 and a gateway mobile location center (GMLC) 299.

The E-SMLC 298 may be operable to manage the overall coordination and scheduling of resources required to find the location of the UE that is attached to the RAN, in this example embodiment the E-UTRAN. The GMLC 299 may contain functionalities required to support location services (LCS). After performing an authorisation, it may send positioning requests to the MME 208 and receive final location estimates.

The P-GW 207 is operable to determine IP address allocation for a UE 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP™ technologies such as CDMA2000 and WiMAX™ networks.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one P-GW (203) (amongst other elements) has been adapted to support the concepts hereinafter described.

The main component of the RAN is an eNodeB (an evolved NodeB) 210, which performs many standard base station functions and is connected to the CN 204 via an S5/S8 interface and to the UEs 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in 3GPP™ nomenclature). Each of the UEs 225 comprise a transceiver unit 227 operably coupled to signal processing logic (with one UE illustrated in such detail for clarity purposes only). The system comprises many other UEs 225 and eNodeBs 210, which for clarity purposes are not shown.

Figure 1:
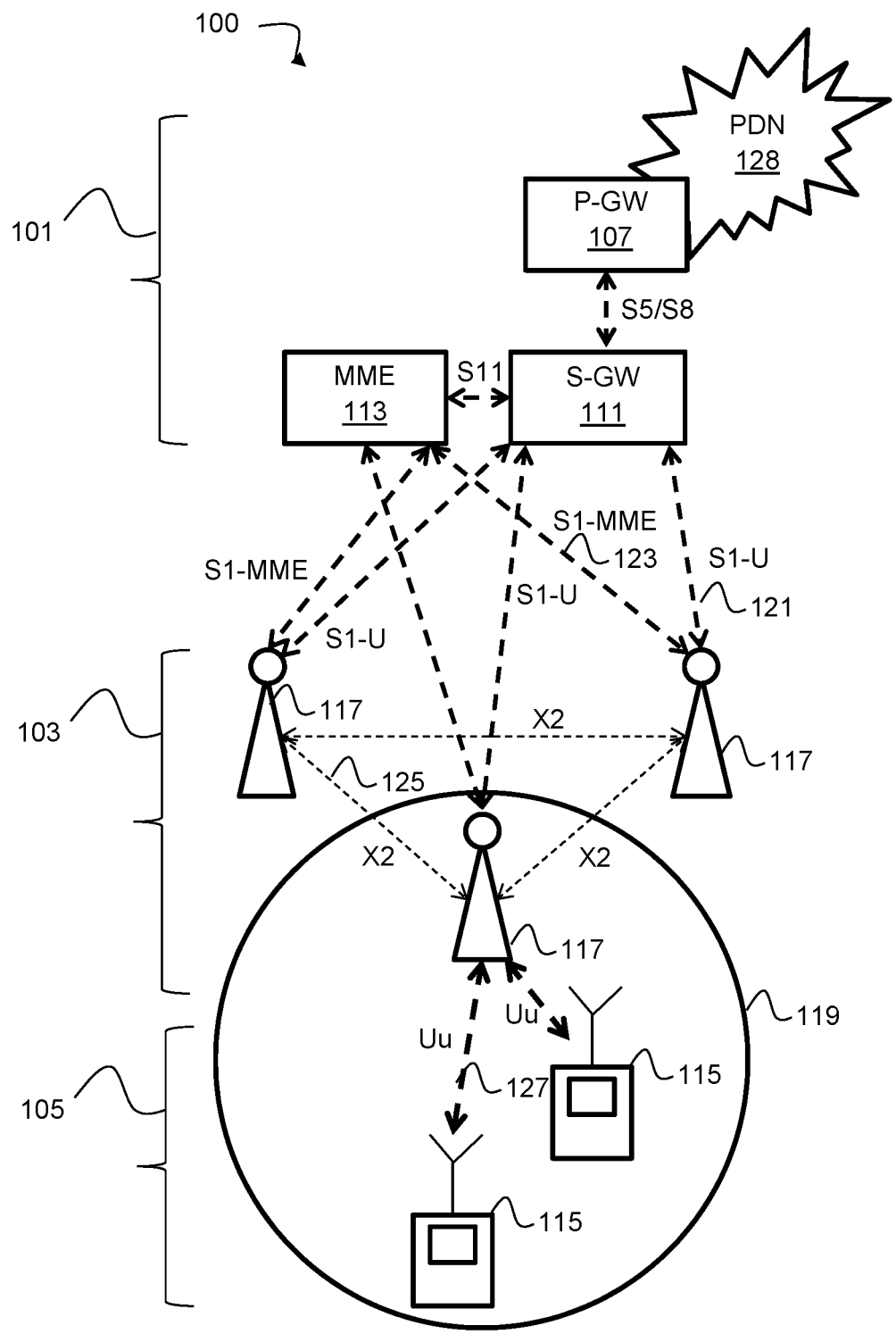
FIG. 1 illustrates a simplified known example of an evolved packet system.

In the evolved packet system 100 of FIG. 1, one P-GW 107 is allocated per external packet data network (PDN) 128. With respect to transferring user plane data, if this P-GW 107, which may be denoted as a first P-GW, becomes unavailable, it may not be possible to access the PDN or to route data from or to UEs 115.

Thus, in accordance with some examples of FIG. 2, a further local EPC 201 may be implemented within the wireless communications system 200, which may have some or all of the functionality of the EPC 204. In examples of the invention, the term 'local' may be interchanged with the term 'proxy'.

In some examples, the local EPC 201 may be situated in close proximity to the RAN domain. In other examples, the local EPC 201 may be situated close to an edge of the network domain, or co-located within one or more eNodeBs 210. In yet more examples, the local EPC 201 may be located just outside of the RAN domain.

In some examples, the local EPC 201 may comprise a local P-GW (203), which may, in some examples, function as a proxy P-GW, and may be denoted as a second P-GW or a P-GW located in a second network. Thus, if communications link 205 between P-GW 207 and local P-GW 203 is active, which may be a GRE or GTP tunnel, then a backhaul link is available.

In the context of this invention, a backhaul link may be defined as a backhaul portion of the network, which may comprise intermediate links between the core network elements 204 and components of the RAN.

In this case, the local P-GW 203 may be operable to build up local context information by intercepting signalling information and forwarding or converting and forwarding (e.g. when GTP and PMIP based interfaces may be terminated at the local P-GW 203 to the P-GW 207 and a serving gateway, for example an S-GW 206 respectively) the intercepted signalling information to the P-GW 207. If this backhaul link becomes unavailable, i.e. the P-GW 207 is no longer available or not functioning correctly, in one example embodiment the local P-GW 203 may take over and replace the P-GW 207 for at least some functionality, for example by terminating any new session management signalling, and deferring signalling to the P-GW 207.

In this example embodiment, the S-GW 206 is located within the local EPC 201, and may be operably coupled to MME 208 via an S11 interface and operably coupled to the local P-GW 203. Further, the MME 208 may be operably coupled to the local EPC 201 via an S1-MME interface. The Gateway 206 predominantly acts as a mobility anchor point and is capable of providing internet protocol (IP) distribution of user plane data to eNodeBs 210. The Gateway 206 may receive content via the P-GW 207, from one or more content providers 209 or via the external PDN 202. As the Gateway 206 comprises an S-GW, the eNodeBs 210 are connected to the S-GW 206 and the MME 208 directly. In this case, all UE packets may be transferred through the S-GW 206, which may serve as a local mobility anchor for the data bearers when a UE 225 moves between eNodeBs 210. The S-GW 206 may also be capable of retaining information about the bearers when the UE 225 is in an idle state (known as EPS connection management IDLE), and temporarily buffers downlink data while the MME 208 initiates paging of the UE 225 to re-establish the bearers. In addition, the S-GW 206 may perform some administrative functions in the visited network, such as collecting information for charging (i.e. the volume of data sent or received from the UE 225). The S-GW 206 may further serve as a mobility anchor for inter-working with other 3GPP™ technologies such as GPRS™ and UMTS™.

If the backhaul subsequently becomes available, thereby allowing access to P-GW 207 again, the local EPC 201 may trigger the deferred signalling and the local P-GW 203 may return to a 'proxy' mode of operation.

In the case of local EPC 201, processes may have to be put in place to allow management of user plane flows/bearers and switching between local EPC 201 and EPC 204 if, for example, part or all of EPC 204 becomes unavailable.

In some example embodiments, the S-GW 206 may be controlled via the MME 208 or a local MME 211, which may also be situated within the local EPC 201.

Figure 3:
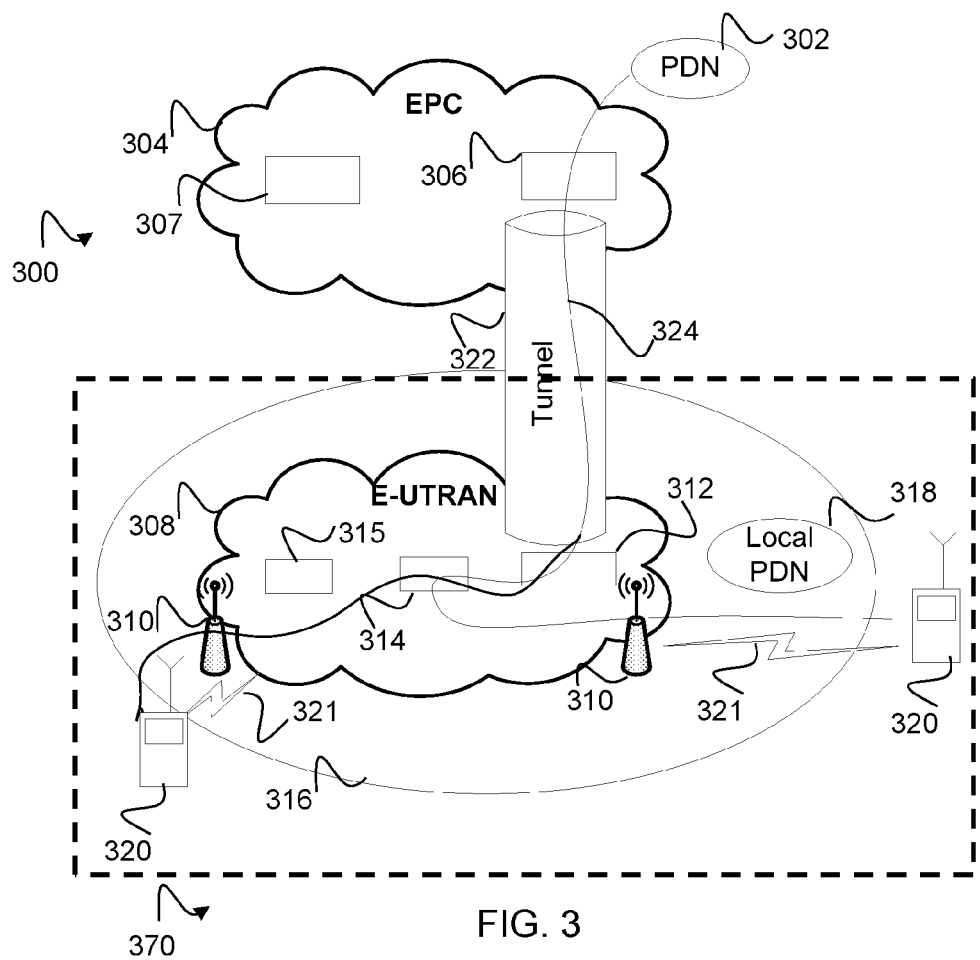
FIG. 3 illustrates an example block diagram of a simplified example of a wireless communications system adapted in accordance with some example embodiments of the present invention.

Referring to FIG. 3, a simplified wireless communications system 300 is illustrated in outline, in accordance with an example embodiment of the invention. In this example, wireless communications system 300 may comprise a PDN 302, an EPC 304 comprising at least a first P-GW, for example main P-GW 306 and a first MME, for example main MME 307, and an access network 316, for example a E-UTRAN 308. Access network 316 may comprise a plurality of eNodeBs 310, a second P-GW, for example local P-GW 312, an S-GW 314 and a second MME, for example local MME 315. Access network 316 may also include a local PDN 318.

UEs 320 may be operable to receive and transmit 321 via eNodeBs 310 and receive user plane data 324, which may have originated from main P-GW 306.

In this example, a backhaul link, represented by tunnel 322, may be available and, therefore, main P-GW 306 may be operational (this case may be referred to as a 'mode A' of operation). Therefore, user plane data 324 may be transmitted by PDN 302 on an SGi 1 interface via the main P-GW 306 to the local P-GW 312 via tunnel 322, which may be a GRE or GTP tunnel using an SGi 2 interface. User plane data 324 may then be transmitted to the local S-GW 314 on an S5 interface before being transmitted to UEs 320 via eNodeBs 310. In some examples, the IP address(es) for UEs 320 may be allocated by the main P-GW 306 or by the PDN 302. The local S-GW 314 may establish S5 bearers with the local P-GW 312, and the local P-GW 312 may tunnel IP packets to the main P-GW 306 via tunnel 322. In this case, QoS may be maintained as it is a managed network. Further, in some examples, main MME 307 may allocate the local S-GW 314 and the main P-GW 306, whereas the local MME 315 may allocate the local P-GW 312 once the main MME 307 has allocated the main P-GW 306. In this 'mode A' operating state, the local P-GW 312 may be operable to forward user plane traffic to and from the main P-GW 306. In this case, the local P-GW 312 may perform data forwarding based on tunnel information stored in the UE context, or configured in mapping tables. For example, data transported over a particular GTP tunnel 322 may be passed (de-capsulated/encapsulated) onto another tunnel (either GTP or GRE respectively, for GTP and MIP/PMIP operations). In some examples, this operation may be applied in the reverse direction. In some other examples, tunnel 322 may represent a plurality of tunnels.

In another example, for example a downlink scenario, the local P-GW 312 may check internal queue(s) for each GTP tunnel/GRE tunnel coming from the main P-GW 306 and determine whether a new data packet is available. If the local P-GW 312 determines that there is not a new data packet available, it may continue to monitor the main P-GW 306. Otherwise, if the local P-GW 312 detects a new data packet, it may be operable to determine the bearer/tunnel for which the new data packet was received in order to determine a corresponding destination tunnel/bearer (using a one-to-one mapping) and forward the new data packet over the determined bearer/tunnel to the destination UE 320.

In some examples, local PDN 318 and PDN 302 may be identifiable by a unique access point name (APN). The local P-GW 312 may be operable, in some examples, to route data between UEs 320 and PDN 302 and local PDN 318. In some examples, the local P-GW 312 may function as the main P-GW 306 if backhaul link 322 is not available. Further, local P-GW 312 may function as a proxy device if the backhaul link 322 is available. Therefore, local P-GW 312 may have dual functionality, Referring now to FIG. 4, the example of the access network and UE part 370 of FIG. 3 is illustrated, wherein connection to the main P-GW 306 has been lost. Therefore, in this example, there may be no backhaul link, tunnel 322, between the main P-GW 306 and the local P-GW 412 (this case may be referred to as a 'mode B' of operation). In this example, the local P-GW 412 may monitor the main P-GW's 306 availability by utilising standard monitoring methods such as GTP-U or GRE link supervision procedures. If a network outage is detected, i.e. there is no longer a backhaul link, for example tunnel 322, between main P-GW 306 and local P-GW 412, the local P-GW 412 may switch to its 'mode B' operating state. As a result, the local P-GW 412 may forward user plane traffic to local UEs 420 if the destination IP address is known, or alternatively discard the user plane traffic if the destination IP address is not known. In some cases, the local P-GW 412 may determine destination IP addresses during its 'mode A' operating state.

In some further examples, it is envisaged that it may not be the local P-GW 412 that is operable to terminate and forward user plane data 424. For example, it may be that the S-GW 414 or the eNodeBs 410 may be operable to loop data to UEs 420. However, the closer to the edge of the network 416, the lower the probability that UEs 420, for which data packets may be destined, will be known to other local entities within access network 416. Therefore, in some examples, a hierarchical structure may be utilised, whereby each node 412, 414, 410 may check whether the UEs 420 for which data packets are destined are known, and act as above if one of the nodes in the hierarchical structure knows the destination of the data packets.

Therefore, in some examples, an eNodeB 410 may receive information from UE 420, and determine whether it knows the destination address of the UE information. If the eNodeB does know the destination address, it may forward the information onto its destination. Otherwise, the eNodeB may pass the information onto S-GW 414. The S-GW 414 may perform a similar operation to the eNodeB 410, and determine whether it knows the destination address of the forwarded information from the eNodeB 410. If the information reaches the local P-GW 412, and the local P-GW 412 does not know the destination address the local P-GW 412 may discard the information. In this way, a 'packet lookup' function is applied through elements of the network.

Figure 4:
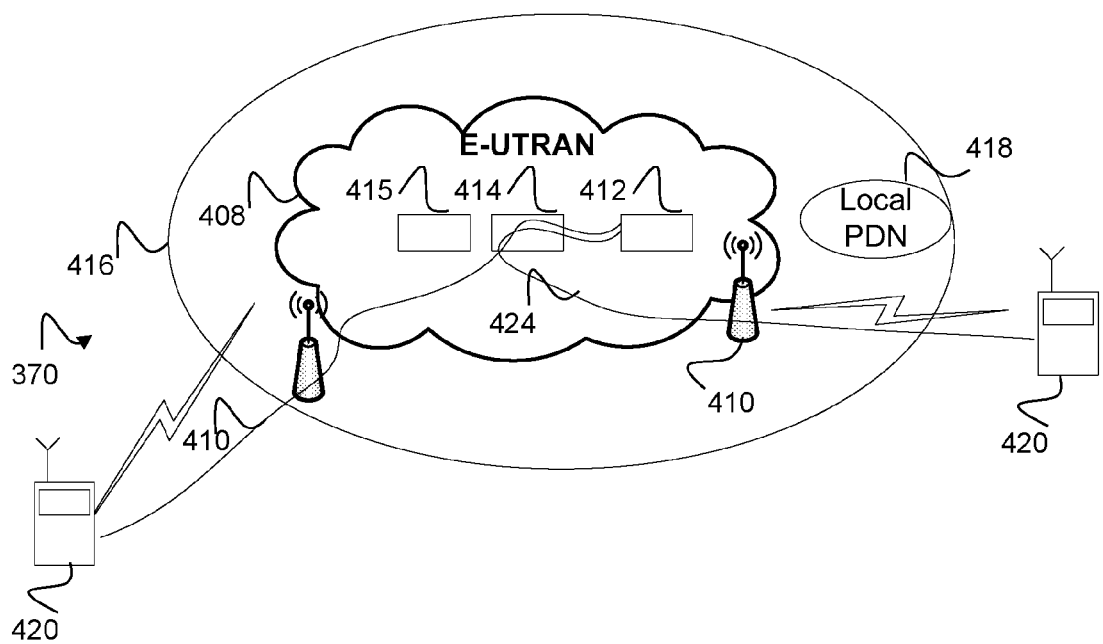
FIG. 4 illustrates the access network part of FIG. 3 adapted in accordance with some example embodiments of the present invention.
Figure 5:
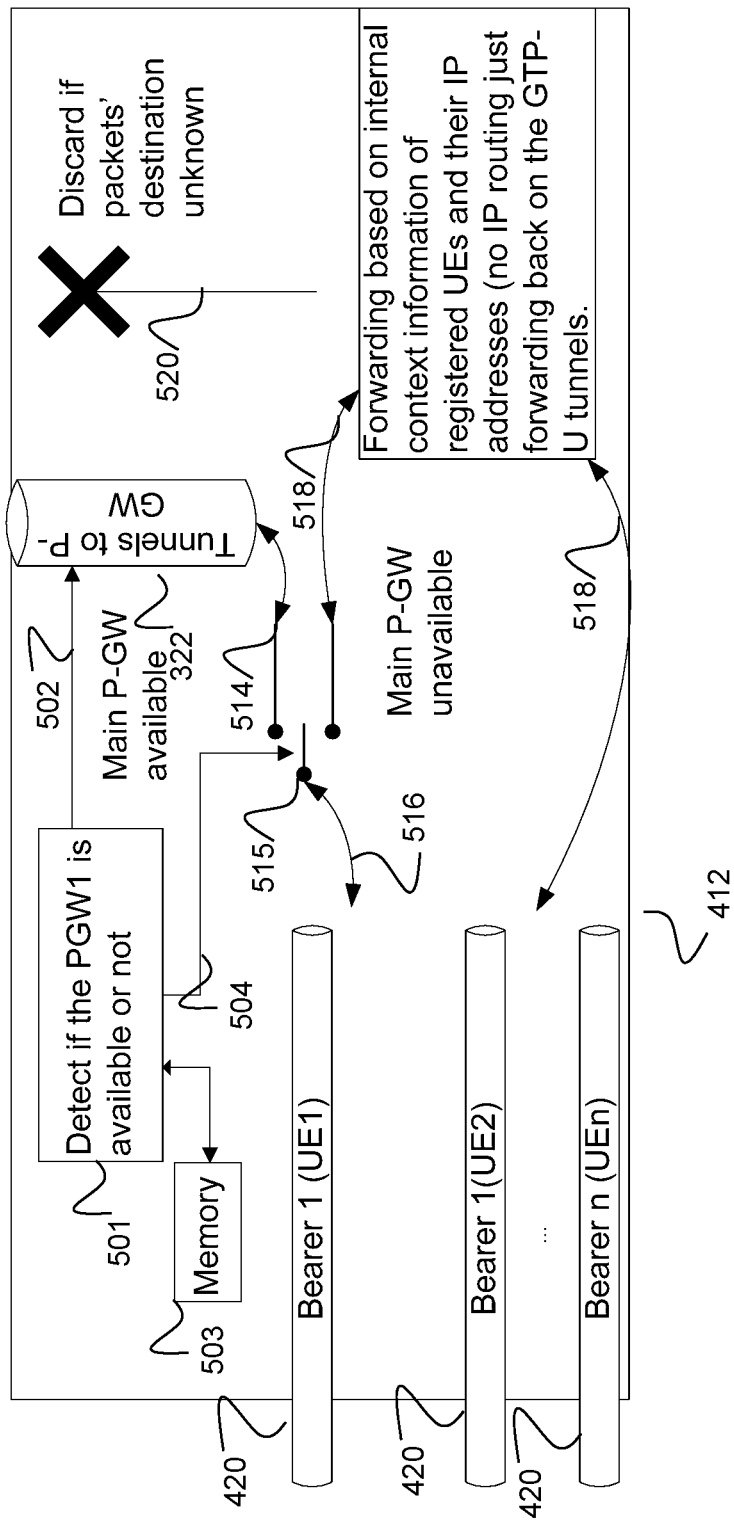
FIG. 5 illustrates a simplified example of switching operation at a local P-GW adapted in accordance with some example embodiments of the present invention.

Referring to FIG. 5, an example of a switching operation at a local P-GW, for example local P-GW 412 from FIG. 4, is illustrated in accordance with an example of the invention. In this example, local P-GW 412 may determine in detection module 501 if a main P-GW, for example main P-GW 306, is available. In this example, detection module 501 may be, or incorporate, at least one processor, which may be operably coupled to a backhaul link, for example at least one tunnel 322. The detection module/processor 501 may determine via link 502 if main P-GW 306, for example, is available or not on the at least one tunnel 322. Further, detection module/processor 501 may be operable to store, in a memory 503, internal context information of registered UEs and their IP addresses, obtained from interrogating the at least one tunnel 322 via link 502. The detection module/processor 501 may be further operable to control, via link 504, at least one switching module 515, which is operable to transition between different modes of operation. If it is determined that the main P-GW 306 is available, the local P-GW 412 may be in, or transition to, a 'Mode A' of operation, and receive 514 user plane data from a backhaul link, for example at least one tunnel 322, and relay 516 this information onto relevant bearers/UEs 420. In some examples, during this mode of operation, the local P-GW 412 may, while forwarding messages, analyse content of the forwarded messages and update local UE context information based on the information gathered.

If, however, it is detected 501 that the main P-GW 306 is not available, the local P-GW 412 may switch the at least one switching module 515 to a 'Mode B' of operation, and forward 518 user plane data to relevant bearers/UEs 420. In this case, the forwarding 518 of user plane data may be based on internal context information of the registered UEs 420 and their IP addresses. In some examples, the internal context information may have been determined during the 'Mode A' operating state when the local P-GW 412 may have analysed content of any forwarded messages. It should be noted that there is no IP routing for UE's U-Plane data within the local P-GW 412 as all data is carried over tunnels. However, if communication with one or more local PDN 418 is required, IP routing would be utilised. If the local P-GW 412 is not aware of the destination of the user plane data, it may discard 520 the user plane data.

In some examples, it may be required to re-allocate local S-GW 414 (not shown). This may be, for example, if UEs 420 move out of the current service area serviced by local S-GW 414. The re-allocation of the local S-GW 414 may be performed by main MME 307 (not shown) or local MME 415 (not shown) dependent, say, on operational circumstances. In a particular example, the main MME 307 may be responsible for re-allocating the local S-GW 414 if there is a link between the main P-GW 306 and the local P-GW 412. Otherwise, the local MME 412 may be responsible for re-allocating the local S-GW 414 if the main P-GW 306 is unavailable, as in this case there may be no link between the main MME 307 and the access network 316. In some cases, when re-allocating the local S-GW 414, it may be necessary for the main MME 307 or the local MME 415 to update binding information and local context information at the local P-GW 412.

In some examples, the local P-GW 412 may be re-allocated as opposed to the main P-GW 307, which may have been selected at the time a PDN, for example PDN 302, (not shown) connection was established. This may be, for example, due to the local P-GW 412 being deployed in a geographical region serving local UEs 420, and its allocation may become sub optimal in relation to future geographical locations of the UEs 420.

Figure 6:
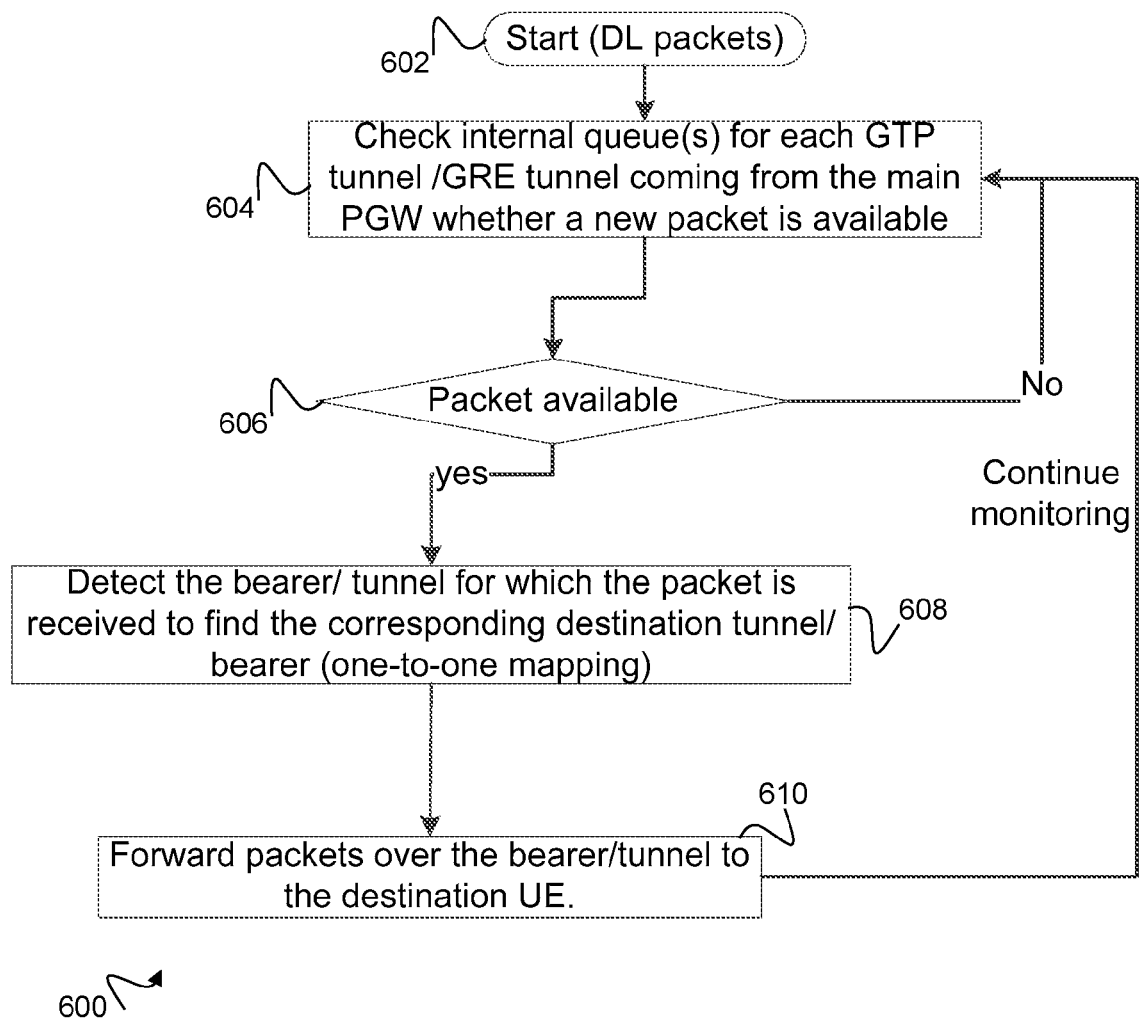
FIG. 6 illustrates a simplified example of a flow diagram of a downlink operation of a wireless communications system adapted in accordance with some example embodiments of the invention.

Referring to FIG. 6, a flow diagram illustrating a downlink operation 600 of a wireless communications system, for example the wireless communications system illustrated in FIG. 3, is shown in accordance with an example embodiment of the invention.

At 602, downlink data, may be received at a local P-GW, for example local P-GW 312, via a backhaul link, for example one or more tunnel(s) 322. At 604, local P-GW 312 may check internal queue(s) for each GTP tunnel/GRE tunnel(s) 322 coming from a main P-GW, for example main P-GW 306, and determine whether a new data packet(s) is available, for example a user plane data packet. If, at 606, the local P-GW 312 determines that a new data packet is not available, it may loop back to 604. Otherwise, if it determines that a new data packet is available, it may transition to 608 and detect the relevant bearer(s)/tunnel(s) for the received data packet(s), and find corresponding destination tunnel(s)/bearer(s) (one-to-one mapping). At 610, the local P-GW 312 may, once destination tunnel(s)/bearer(s) have been located, forward the data packet(s) over the detected bearer(s)/tunnel(s) to a destination UE(s) before subsequently returning to 604.

This example may only be applicable where there is a backhaul link available 322, for example where there is a connection between a main P-GW 306 and local P-GW 312, as otherwise there would be no downlink packets to be received from the main P-GW 306.

Figure 7:
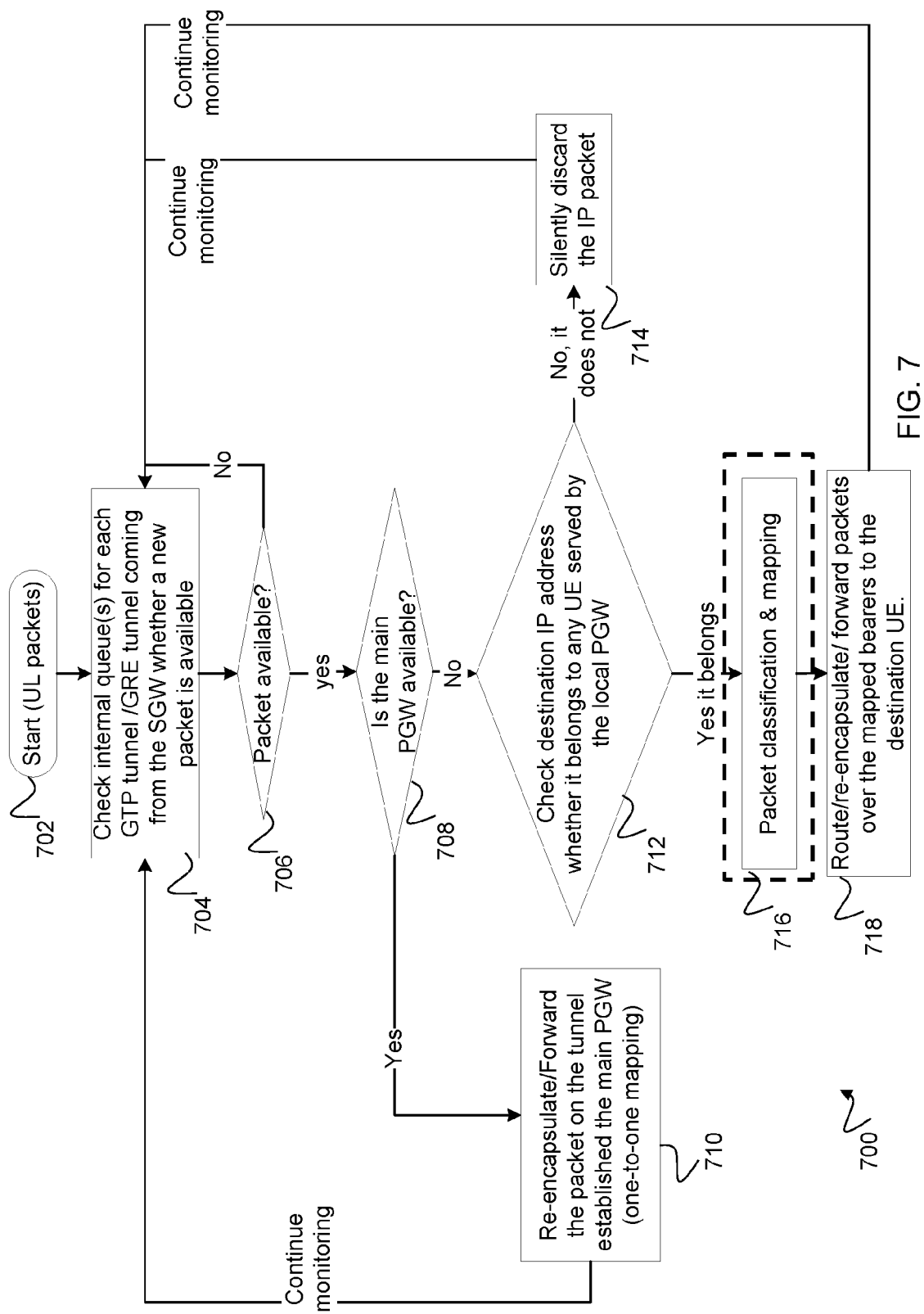
FIG. 7 illustrates a simplified example of a flow diagram of an uplink operation of a wireless communications system adapted in accordance with some example embodiments of the invention.

Referring now to FIG. 7, a flow diagram illustrating an uplink operation 700 of a wireless communications system, for example the wireless communication system illustrated in FIGS. 3 and 4, is shown in accordance with an example embodiment of the invention.

At 702, uplink packets, for example user plane data packets, received from UE(s), may be transmitted from local P-GW, for example local P-GW 312/412, via a backhaul link, for example one or more tunnel(s) 322. At 704, the local P-GW 312/412 may check internal queue(s) for each GTP tunnel(s)/GRE tunnel(s) coming from an S-GW, for example local S-GW 314/414, and determine 706 whether a new uplink packet(s) is available.

If the local P-GW 312/412 determines at 706 that a new uplink packet(s) is not available, it may return to 704. Otherwise, if it determines at 706 that a new uplink packet(s) is available, it may determine at 708 whether a main P-GW, for example P-GW 306, is available. If local P-GW 312/412 determines that main P-GW 306 is available, for example there is a backhaul link in place, then it may, at 710, re-encapsulate/forward the received uplink packet(s) onto a tunnel, for example one or more tunnels 322, established by main P-GW 306 (one-to-one mapping). If, however, local P-GW 312/412 determines that main P-GW is not available at 708, for example there is no longer a backhaul link in place, then it may, at 712, switch to an alternative mode of operation and check whether the uplink packet(s)' destination IP address belongs to any UE currently served by it. In some examples, the local P-GW 314/414 may analyse data during 710 and update its records to enable it to determine IP addresses belonging to UEs served by it.

If local P-GW 314/414 determines that the destination IP address of uplink packet(s) does not belong to any UE(s) it is currently serving, it may discard 714, in some examples silently discard, the uplink packet(s) and continue monitoring the system at 704. If, however, the local P-GW 314/414 determines that the destination IP address of uplink packet(s) does belong to any UE(s) it is currently serving, it may perform a packet classification and mapping procedure 716 before routing/re-encapsulating/forwarding 718 uplink packet(s) over previously mapped bearers to a destination UE(s), and subsequently returning to 704.

Figure 8:
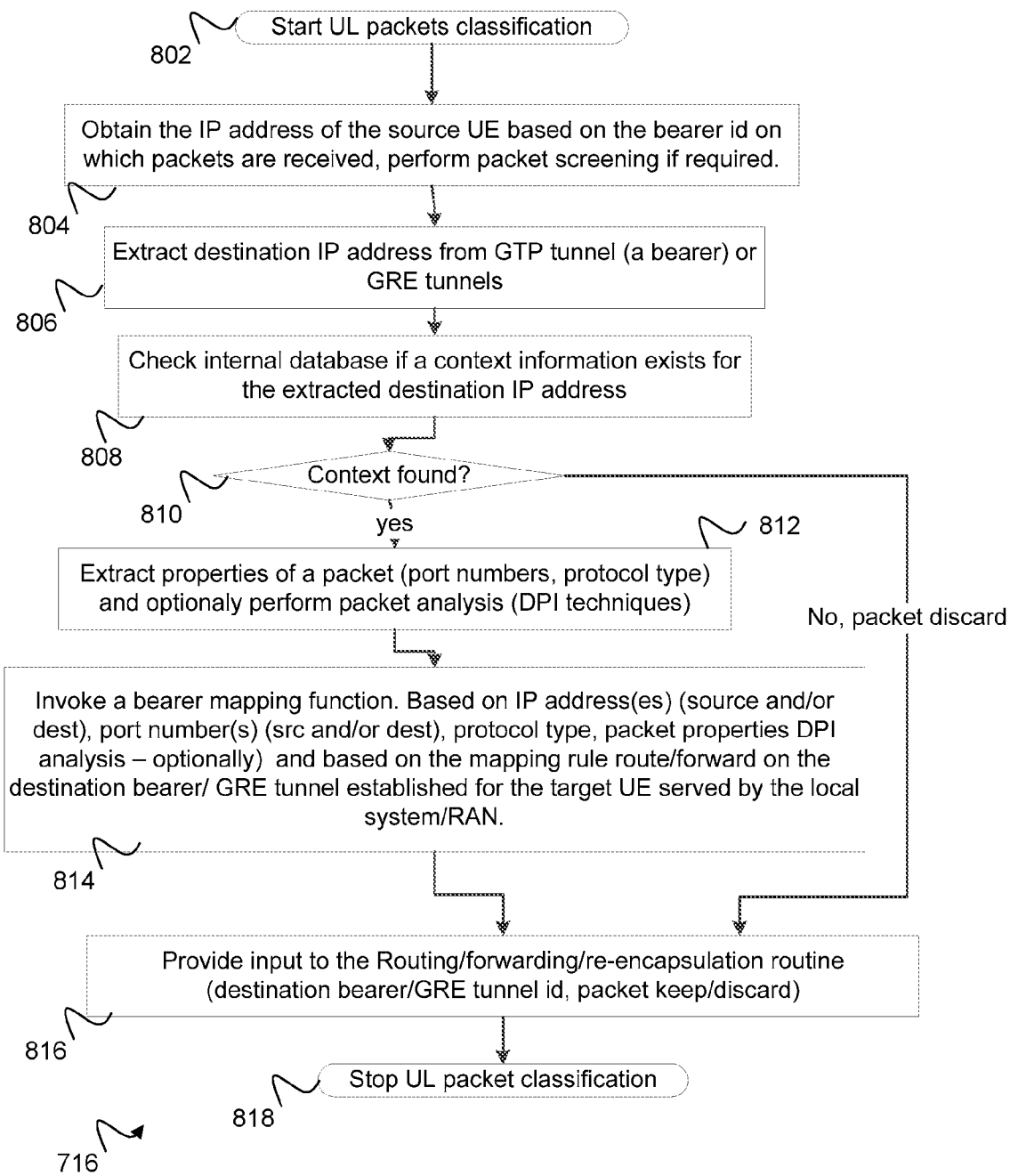
FIG. 8 illustrates a simplified example of a flow diagram of further details of FIG. 7 in accordance with some example embodiments of the invention.

Referring to FIG. 8, a further flow diagram illustrating aspects of FIG. 7 in further detail is shown in accordance with an example embodiment of the invention. In this case, FIG. 8 may relate to the packet classification and mapping stage 716 of FIG. 7. Initially, at 802, uplink packet classification may commence and, at 804, a local P-GW, for example P-GW 314/414, may obtain an IP address of a source UE that may be based on bearer identification information from previously received uplink packet data. In some cases, packet screening may be required. At 806, local P-GW 314/414 may extract destination IP address(es) from tunnel(s), for example from a payload of a GTP packet (a bearer) or GRE tunnel(s), and, at 808, check a database, which may be an internal database, in order to determine whether or not context information exists for the extracted destination IP address(es). If, at 810, the local P-GW 314/414 determines that context information does exist for the one or more destination IP addresses, it may, at 812, extract properties, for example port numbers and protocol type, of any relevant uplink packets and optionally perform packet analysis, using for example deep packet inspection (DPI) techniques. At 814, the local P-GW 314/414 may invoke a bearer mapping function on any resultant data, which may be source and/or destination IP address(es), source and/or destination port number(s), protocol type packet properties, and optionally DPI and statistical analysis. Based on the resultant bearer mapping function and mapping rules, resultant data may be forwarded/routed onto a relevant destination bearer/GRE tunnel established for a target UE served by the local system/RAN. At 816, the local P-GW 314/414 may provide an input to a routing/forwarding/re-encapsulation routine, for example destination bearer/GRE tunnel ID, which may determine whether the packet should be kept. If, at 810, the P-GW 314/414 determines that no context information has been found, it may discard the packet, in some cases silently, and transition to 816. At 818, the packet classification and mapping stage may stop and transition to 718 from FIG. 7 and not terminate packets.

Figure 9:
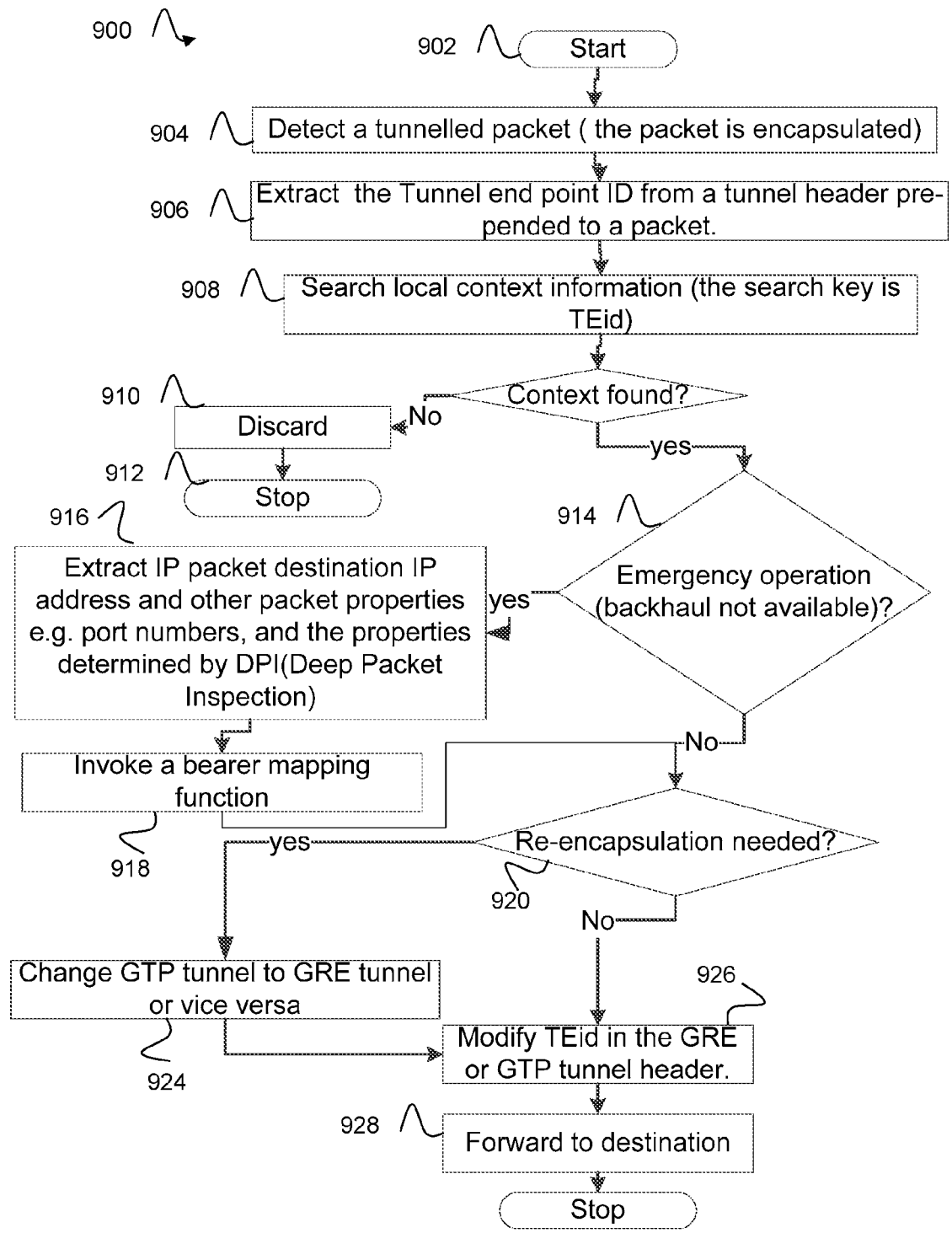
FIG. 9 illustrates a simplified example of a flow diagram of operations of a wireless communications system adapted in accordance with some example embodiments of the invention.

Referring to FIG. 9, a flow diagram 900 illustrating example operations of a wireless communications system is shown in accordance with an example of the invention. In this example, the flow diagram 900 may illustrate an emergency user plane operation at a local P-GW, for example local P-GW 312/412. Initially, at 902, the emergency user plane operation commences and, at 904, local P-GW 312/412 may be operable to detect an encapsulated tunneled packet, which may be a user plane packet. At 906, the local P-GW 312/412 may extract a tunnel end point ID, identifier, from a tunnel header pre-pended to the detected packet and, at 908, search local context information. The local P-GW 312/412 may search an internal database to determine whether context information exists for the detected packet using a search key, for example search key tunnel endpoint identifier (TEid) for GTP tunnels. However, other tunneling protocols, such as GRE, may use applicable tunnel identifiers (e.g. GRE key). If the local P-GW 312/412 determines that context information does not exist for the detected packet, it may discard the packet 910, in some examples silently and stop the procedure at 912.

If, however, the local P-GW 312/412 determines that context information does exist for the detected packet, it may, at 914, determine whether or not an emergency operation is necessary. In this example, an emergency operation may be required if there is no detected backhaul link available between local P-GW 312/412 and a higher level system, for example EPC 304. If, at 914, the local P-GW 312/412 determines that an emergency operation is required, it may, at 916, extract a number of properties from the detected packet such as, for example, IP packet destination IP address(es), port numbers, and properties that may be determined by DPI, before transitioning to 918 and invoking a bearer mapping function. If the local P-GW 312/412 determines 914 that an emergency operation is not required, it may determine whether re-encapsulation 920 is required. In this example, local P-GW 312/412 may also invoke this step, 920, after invoking a bearer mapping function in 918. If local P-GW 312/412 determines that re-encapsulation 920 is required, it may change at 924 the current tunnel that may be a GTP tunnel, to a GRE tunnel, or vice versa, before transitioning to 926 and modifying a search key, for example TEid, in the GRE or GTP tunnel header. If the local P-GW 312/412 determines that re-encapsulation, 920, is not required, it may also transition to 926 and modify a search key, for example TEid, in the GRE or GTP tunnel header before forwarding the detected packet onto its destination at 928.

So far, discussion of some illustrated embodiments has focussed on aspects such as managing and routing packets between, for example, a main P-GW and a local P-GW via at least one tunnel. Further, some other example embodiments have focussed on aspects of switching of a local P-GW, for example if a backhaul link, tunnel, may no longer be available between a main P-GW in an EPC and a local P-GW in an access network. For completeness, techniques are also envisaged of how to handle bearer(s)/PDN connection(s) management procedures in examples where a backhaul link is available and subsequently unavailable. Further, some previous examples have discussed routing packets and switching for UEs already attached to the network. In some examples, new UEs may need to attach to the network when there is no backhaul link available.

Figure 10:
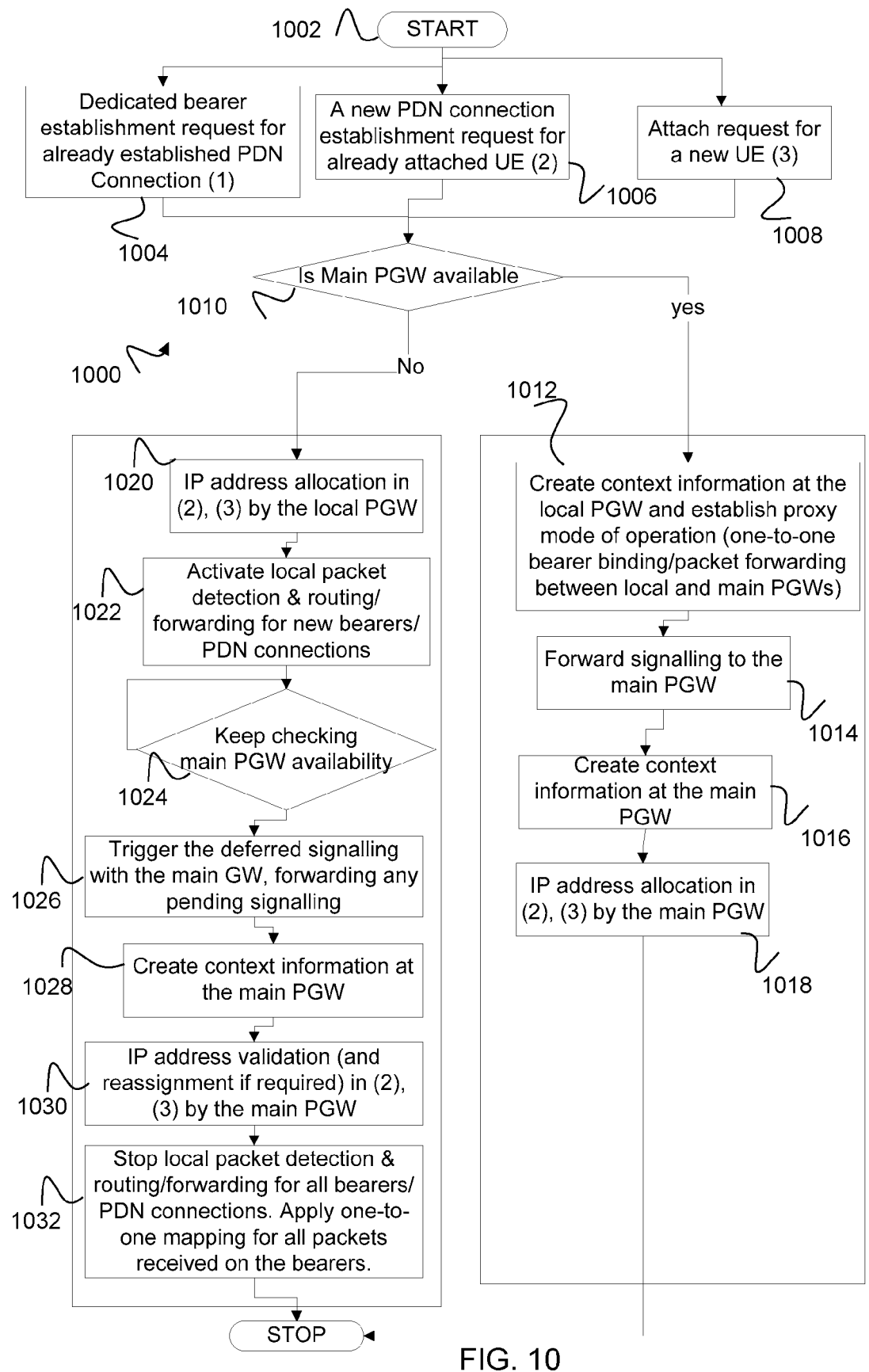
FIG. 10 illustrates a simplified example of a flow diagram of connection management operations for a wireless communications system adapted in accordance with some example embodiments of the invention.

Referring to FIG. 10, a flow diagram 1000 illustrating an example of bearer and PDN connection management for a wireless communications system is shown in accordance with an example of the invention. Initially, at 1002, the procedure begins, and the system determines whether an incoming packet is one of a dedicated bearer establishment request for an already established PDN connection 1004, a new PDN connection establishment request for an already attached UE 1006, or an attach request for a new UE 1008. At 1010, irrespective of the determination, a local P-GW, for example local P-GW 312/412 may determine whether a main P-GW is available, for example main P-GW 306. If the local P-GW 312/412 determines that main P-GW 306 is available, it may begin forwarding messages to the main P-GW 306, analyse content of the messages and based on any information gathered, local UE context information may be created/updated/deleted. Bearer management procedures require UE context information to be updated or deleted, and the PDN connection management procedures require UE context information to be created/updated/deleted.

In some examples, the local P-GW 312/412 may act as a proxy P-GW that builds up UE context information based on signalling messages exchanged between main P-GW 306 and S-GW, for example S-GW 314/414, via the local P-GW 312/412. Although the local P-GW 312/412 may terminate the S5 bearer, the local P-GW 312/412 may appear to the S-GW 314/414 as the main P-GW 306, and appear to the main P-GW 306 as the S-GW 314/414. Therefore, the main P-GW 306 may be unaware of the local P-GW 312/412, which may have polymorphic functions depending on which network entity uses its services. Specifically, at 1012, the local P-GW 312/412 may create context information and establish a proxy mode of operation (one-to-one bearer binding/packet forwarding between itself and main P-GW 306). At 1014, the local P-GW 312/412 may forward signalling to the main P-GW 306 and, at 1016, context information at the main P-GW 306 may be created. At 1018, the main P-GW 306 may be operable to allocate IP addresses in the case of 1006 and 1008 as a backhaul link may be available.

If local P-GW 312/412 determines that main P-GW 306 is not available at 1010, for example there is no backhaul link available, the local P-GW 312/412 may be operable to terminate any control plane signalling and defer any communication with the main P-GW 306 until the main P-GW 306 is reachable and/or operational again. This signalling may be required to allow the main P-GW 306 to obtain current UE context information, i.e. to be synchronised with UE context information stored at the local P-GW 312/412. Specifically, at 1020, the local P-GW 312/412 may be operable to allocate IP addresses in the cases of 1006 and 1008. It should be noted that there is no IP routing within the local system as all data is carried over tunnels, for example GTP tunnels 322. IP address allocation at 1020 may only be required to meet application layer requirements at UEs, and to enable packet forwarding onto GTP-U tunnels in the local P-GW 312/412. However, issues may arise as how to manage IP address allocation, and how to manage the local P-GW 312/412 if the main P-GW 306 becomes available again.

In this example, from an IP layer viewpoint, UE terminals may be considered as 'always ON'. In this example IP address(es) assigned for an existing PDN connection 1004 may not be changed, as this may disturb the application layer. However, in some examples, it may be possible to update IP address(es) for existing PDN connections 1004 if DHCP is utilised. In the case of 1006 and 1008 where the main P-GW 306 is not available, the local P-GW 312/412 may be required to defer any registration/signalling with main P-GW 306 until it is reachable again. In the case of UEs, the local P-GW 312/412 may be required to provide sufficient information to the UEs in order to enable establishment of a new PDN connection 1006, for example to provide/assist in IP address allocation. If IP address(es) are allocated at the time a PDN connection is established, it may also be required to utilise an IP address that can be routable at the main P-GW 306 or external PDN, as otherwise the IP address may need to be re-assigned when the main P-GW 306 is reachable again. In the case of 1006 and 1008, there may be several examples of how IP address(es) may be allocated, for example:—

IPv6 stateless configuration;
IPv6 state full configuration (i.e. via dynamic host configuration protocol (DHCP) v6);
via any point-to-point (PPP) like protocol;
IPv4 state full configuration (DHCP);
IPv4 via control plane signalling (at the time a UE may attach 1008 or a new PDN connection may be established 1006).

Referring to IPv6 stateless configuration, due to a large IPv6 address space available, allocation utilising this configuration should be possible, provided that the IPv6 prefix used by UEs is topologically correct with the main P-GW 306. However, the local P-GW 312/412 may be required to trigger deferred signalling exchange when the main P-GW 306 becomes reachable again. In this case, GTP-C protocol messages may be utilised if GTP tunneling is used, or MIP/PMIP signalling if not.

Referring to IPv6 state full configuration, the local P-GW 312/412 may be required to trigger deferred signalling exchange as defined for IPv6 stateless configuration. However, IP addresses assigned to UEs may need to be topologically correct with the main P-GW 306 and signalled by the local P-GW 312/412 to the main P-GW 306 when deferred signalling is triggered, unless UEs have triggered DHCP rebinding, which may result in allocation of a different IP address. If the assigned IP address(es) is not topologically correct, it may need to be rebound by the DHCP server to make it topologically correct. This is not desirable for the application layer.

Referring to any PPP like protocol, if the assigned IP address is not topologically correct with the main P-GW 306, the IP address may need to be reassigned. For PPP protocols, the network control protocol (NCP) protocol is generally used for network layer configuration. If the NCP protocol cannot reassign the IP address, the PPP client may be required to re "dial-in", which may not be optimal as UEs should not be aware of the availability problems of main P-GW 306.

Referring to IPv4 state full configuration, similar principles apply as defined in relation to IPv6 state full configuration.

Referring to IPv4 via control plane signalling, the UEs IP addresses may be assigned by an HSS within the core network, in which case it can be topologically correct with the main P-GW 306. Otherwise, UEs may be required to reattach to the network, which can be disruptive for the application layer.

Referring to a further example, an IP address allocation scheme is described that may allow local P-GW 312/412 to allocate IP addresses that may be topologically correct with the main P-GW 306, while the main P-GW 306 may not be reachable. In this example, local P-GWs may have a small pool of IP addresses set aside that are topologically correct with the local P-GW 312/412 to handle occasions where a new PDN connection 1006 is required while there is no current connection with the main P-GW 306. Such an arrangement may allow for seamless operation when local P-GW 312/412 becomes available.

In some examples, if it is not possible to allocate addresses that are topologically correct with the main P-GW 306, the local P-GW may perform NAT, or similar, if IP addresses are not topologically correct (PMIP tunneling could be used, in which case NAT would be located at local P-GW).

In another example, there may be several main P-GWs (406) in the system. In this case, there may be less freedom in determining IP addresses of P-GW selection functions and IP address allocation, as otherwise IP address allocation for UEs establishing a PDN connection while there is no backhaul link may need to re-establish PDN connections when the main P-GW becomes available.

At 1022, the local P-GW 312/412 may activate local packet detection and routing/forwarding procedures for new bearers/PDN connections. At 1024, the local P-GW 312/412 may repeatedly check for availability of main P-GW 306. In this case, the local P-GW 312/412 may continue to check availability of the main P-GW until the main P-GW 306 becomes available. Once the local P-GW 312/412 has determined that the main P-GW is available, it may, at 1026, trigger deferred signalling with the main P-GW 306, and forward any pending signalling to the main P-GW 306. At 1028, the local P-GW 312/412 may create context information at the main P-GW 306 and, at 1030, the main P-GW 306 may perform IP address validation and optionally reassignment if required for 1006 and 1008. At 1032, the local P-GW 312/412 may be operable to then stop local packet detection and routing/forwarding for all bearers/PDN connections, and apply one-to-one mapping for all packets received on the bearers.

In some examples, at least two P-GWs may be allocated for each PDN network. This may provide, advantageously, the ability for the PDN network to communicate with UEs while a backhaul link is available. Further, aspects of the invention may, advantageously, allow communication with UEs while a backhaul link is not available, without the need to re-establish bearers or perform a new registration with the network. Aspects of the invention may further facilitate seamless switching between a mode of operation where there is not a backhaul link and a mode of operation where there is a backhaul link. In this case, there may be no need to re-allocate IP addresses to UEs when there is a switching transition between these two modes. In this way, during an outage scenario, for example where there is no longer a backhaul link, packets for which destinations are known may be forwarded to the relevant UEs, and packets for which destinations are not known may be discarded.

Figure 11:
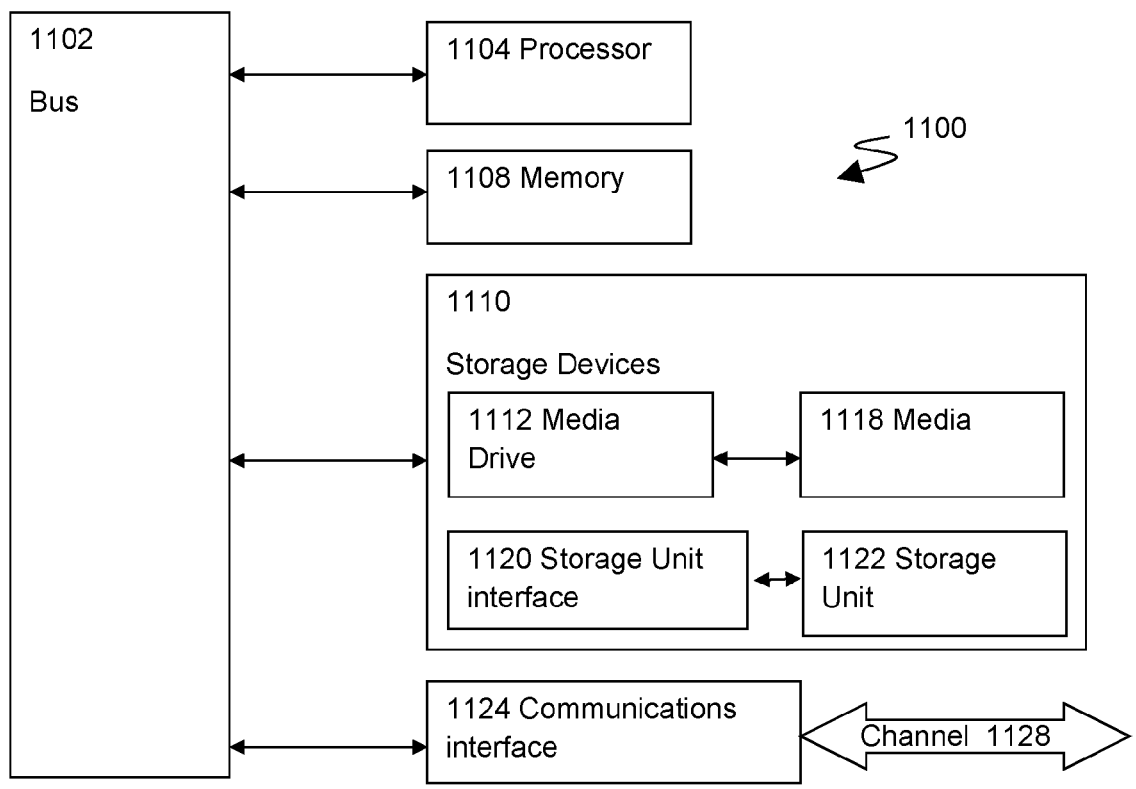
FIG. 11 illustrates a typical computing system that may be employed to implement software controlled switching between a first mode of operation, where a backhaul link may be available, and a second mode of operation where a backhaul link may not be available, adapted in accordance with some example embodiments of the invention.

Referring now to FIG. 11, there is illustrated a typical computing system 1100 that may be employed to implement software controlled switching between a first mode of operation where a backhaul link may be available and a second mode of operation where a backhaul link may not be available in some example embodiments of the invention. Computing systems of this type may be used in wireless communication units. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special-purpose processing engine such as, for example, a microprocessor, microcontroller or other control logic. In this example, processor 1104 is connected to a bus 1102 or other communications medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory (ROM) or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1118 may include, for example, a hard disk, floppy disk, magnetic tape, optical disk, CD or DVD, or other fixed or removable medium that is read by and written to by media drive 1112. As these examples illustrate, the storage media 1318 may include a computer-readable storage medium having particular computer software or data stored therein.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a universal serial bus (USB) port), a PCMCIA slot and card, etc. Software and data transferred via communications interface 1124 are in the form of signals which can be electronic, electromagnetic, and optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 1108, storage device 1118, or storage unit 1122. These and other forms of computer-readable media may store one or more instructions for use by processor 1104, to cause the processor to perform specified operations. Such instructions, generally referred to as 'computer program code' (which may be grouped in the form of computer programs or other groupings), when executed, enable the computing system 1100 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1122, drive 1112 or communications interface 1124. The control logic (in this example, software instructions or computer program code), when executed by the processor 1104, causes the processor 1104 to perform the functions of the invention as described herein.

In one example, a tangible non-transitory computer program product comprises executable program code operable for, switching between a first mode of operation where a backhaul link may be available and a second mode of operation where a backhaul link may not be available in some example embodiments of the invention.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, the program code may be employed by a packet data network gateway (P-GW) located in a second network, for supporting user plane data in a wireless communications system that additionally comprises a first network having a first packet data network gateway (P-GW) operably couplable to the P-GW. The executable program code may be operable for, when executed at the packet data network gateway (P-GW), checking a destination address of received packets from the first P-GW to determine whether the received packets are destined for any of the terminal devices, extracting one or more properties of said received packets if they are destined for at least one from: any of the terminal devices or a local packet data network served with user plane data; or discarding said received packets if they are not destined for the terminal devices or local packet data network.

In one example, the program code may be employed by a packet data network gateway (P-GW) located in a second network, for supporting user plane data in a wireless communications system that additionally comprises a first network having a first packet data network gateway (P-GW). The executable program code may be operable for, when executed at the packet data network gateway (P-GW), monitoring data supplied over the backhaul link to or from the first network; determining an operational status of at least one of: the backhaul link, first P-GW, and in response to determining that both of the backhaul link and first P-GW, are available; performing at least one of: allowing access between the first P-GW and the terminal device; triggering differed signalling between the base station and the first network; and returning to a state that monitors data supplied by the backhaul link from the first network to determine an operational status of at least one of: the backhaul link, first P-GW.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. For example, the integrated circuit may be suitable for a (second) packet data network gateway, P-GW, located in a (second) network for supporting user plane data in a wireless communications system that additionally comprises a (first) network having a first P-GW operably couplable to the P-GW. The integrated circuit comprises a processor arranged to: check a destination address of received packets to determine whether the received packets are destined for any of the terminal devices, and extract one or more properties of said received packets if they are destined for any of the terminal devices served with user plane data; or discard said received packets if they are not destined for the terminal devices.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A second packet data network gateway (P-GW), located in a second network for supporting user plane data to terminal devices in a wireless communications system that additionally comprises a first network having a first P-GW operably couplable to the second P-GW; the second P-GW comprising a processor located on an integrated circuit and arranged to:
  check a destination address of received packets from the first P-GW to determine whether the received packets are destined for any of the terminal devices, and in response thereto:
  extract one or more properties of said received packets if they are destined for any of the terminal devices served with user plane data; or
  discard received packets that are not destined for the terminal device(s); and
  determine an operational status of: a backhaul link of the second network, and the first P-GW located in the first network; and
  in response to determining that both of the backhaul link and first P-GW are available, perform at least one of:
  trigger deferred signaling between at least one of: a mobile management entity, MME, a serving gateway, S-GW, and the first network;
  return to a state that determines an operational status of at least one of; the backhaul link, first P-GW; and
  trigger user plane handling.

2. The second P-GW of claim 1 wherein the processor is arranged to build context information for the terminal devices from signaling used to establish a single packet data network connection for the terminal device that traverses through the first P-GW and the second P-GW.

3. The second P-GW of claim 2 wherein the processor is operably coupled to a memory element arranged to store the terminal device context information.

4. The second P-GW of claim 1 wherein the processor is arranged to monitor and build terminal device context information for a plurality of terminal devices being served with user plane data by the second network.

5. The second P-GW of claim 1 wherein the processor further performs packet analysis or statistical analysis on said received packets.

6. The second P-GW of claim 1 wherein the processor is arranged to re-encapsulate, modify and forward a received data packet on a tunnel established by the first P-GW.

7. A method of operation of a second packet data network gateway (P-GW), located in a second network for supporting user plane data to terminal devices in a wireless communications system that additionally comprises a first network having a first P-GW, operably couplable to the second P-GW; the method comprising, at the second P-GW:
  checking a destination address of received packets from the first P-GW to determine whether the received packets are destined for any of the terminal devices,
  extracting one or more properties of said received packets if they are destined for any of the terminal devices served with user plane data; or
  discarding received packets that are not destined for the terminal device(s); and
  determining an operational status of: a backhaul link of the second network, and the first P-GW located in the first network; and
  in response to determining that both of the backhaul link and first P-GW are available, performing at least one of:
  triggering deferred signaling between at least one of: a mobile management entity, MME, a serving gateway, S-GW, and the first network;
  returning to a state that determines an operational status of at least one of: the backhaul link, first P-GW; and
  triggering user plane handling.

8. The method of claim 7 further comprising performing packet analysis or statistical analysis on said received packets.

9. The method of claim 7 further comprising:
  re-encapsulating a received data packet,
  modifying the received data packet, and
  forwarding the re-encapsulated, modified received data packet on a tunnel established by the first P-GW.

10. A non-transitory computer program product comprising executable program code for operation of a packet data network gateway, second P-GW, located in a second network for supporting user plane data in a wireless communications system that additionally comprises a first network having a first packet data network gateway, first P-GW, the executable program code operable for, when executed at the second P-GW, performing the method of claim 7.

* * * * *

UNITED STATES PATENT AND TRADEMARK OFFICE
CERTIFICATE OF CORRECTION

PATENT NO.         : 9,674,878 B2
APPLICATION NO.    : 15/005591
DATED              : June 6, 2017
INVENTOR(S)        : Robert Zakrzewski It is certified that error appears in the above-identified patent and that said Letters Patent is hereby corrected as shown below:

On the Title Page

Item (72) Inventor: Change "Zakrewski" to -- Zakrzewski --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*